US009914534B2

(12) United States Patent
Meyer et al.

(10) Patent No.: US 9,914,534 B2
(45) Date of Patent: Mar. 13, 2018

(54) METHOD FOR STATIC BALANCING OF AIRCRAFT ROTOR BLADES (71) Applicant: Sikorsky Aircraft Corporation, Stratford, CT (US)

(72) Inventors: Leon M. Meyer, Harwinton, CT (US); Andrew P. Scott, Bethany, CT (US); Anthony Stephen Drago, Southbury, CT (US); Edwin Mark Hafner, Rocky Hill, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/071,872

(22) Filed: Mar. 16, 2016

(65) Prior Publication Data

US 2016/0297518 A1    Oct. 13, 2016

Related U.S. Application Data (60) Provisional application No. 62/143,964, filed on Apr. 7, 2015.

(51) Int. Cl.
*B64C 27/00* (2006.01)
*B64C 27/473* (2006.01)
(Continued)

(52) U.S. Cl.
CPC .......... *B64C 27/008* (2013.01); *B64C 27/473* (2013.01); *B64F 5/10* (2017.01);
(Continued)

(58) Field of Classification Search
CPC ... B64F 5/0009; B64C 27/008; B64C 27/473; B64C 2027/4736; B64C 11/008; B23P 15/04; F01D 5/066; F01D 5/025; F01D 5/027; F03D 1/008; F04D 29/26; Y02T 50/671; Y02T 50/673; Y10T 29/49861;
(Continued)

(56) References Cited

U.S. PATENT DOCUMENTS 4,872,817 A * 10/1989 De Kruif ................ F01D 5/025
416/244 A
5,475,622 A * 12/1995 Reinfelder .............. G01M 1/12
700/279

(Continued)

*Primary Examiner* — Sarang Afzali
(74) *Attorney, Agent, or Firm* — Cantor Colburn LLP (57) ABSTRACT

A method of assembling a rotor blade includes determining first spanwise and chordwise moments of a first component of the blade and comparing the first spanwise and chordwise moments to respective target first spanwise and chordwise moments. The first spanwise and/or chordwise moment(s) of the first component is/are adjusted based upon corresponding results of the comparison to provide balancing of the first component. Second spanwise and chordwise moments of a second component of the blade are determined and compared to respective target second spanwise and chordwise moments. The second spanwise and/or chordwise moment (s) of the second component is/are adjusted based upon corresponding results of the comparison to provide balancing of the second component. The balanced first and second components are assembled to each other so that target spanwise and chordwise moments of the blade are met.

15 Claims, 4 Drawing Sheets (51) Int. Cl.
*B64F 5/10* (2017.01)
*G01M 1/34* (2006.01)
*B23P 15/04* (2006.01)
*G01M 1/32* (2006.01)

(52) U.S. Cl.
CPC ....... *B23P 15/04* (2013.01); *B64C 2027/4736* (2013.01); *G01M 1/32* (2013.01); *G01M 1/34* (2013.01); *Y10T 29/37* (2015.01); *Y10T 29/49337* (2015.01); *Y10T 29/49771* (2015.01)

(58) Field of Classification Search
CPC ......... Y10T 29/49337; Y10T 29/49764; Y10T 29/49771; Y10T 29/49778; Y10T 29/37; G01M 1/04; G01M 1/14; G01M 1/12; G01M 1/20; G01M 1/24; G01M 1/30; G01M 1/32; G01M 1/34
See application file for complete search history.

(56) References Cited

U.S. PATENT DOCUMENTS

| | | | | |
|---|---|---|---|---|
| 5,824,897 A | * | 10/1998 | Beachum | G01M 1/12 73/456 |
| 2015/0082634 A1 | * | 3/2015 | Leahy | B64C 27/008 29/889.71 |

\* cited by examiner

METHOD FOR STATIC BALANCING OF AIRCRAFT ROTOR BLADES

CROSS-REFERENCE TO RELATED APPLICATION

This application claims priority to U.S. Provisional Patent Application No. 62/143,964 filed on Apr. 7, 2015. The entire contents of U.S. Provisional Patent Application No. 62/143,964 are incorporated herein by reference.

BACKGROUND

The subject matter disclosed herein generally relates to rotors for aircraft use and, more specifically, in-process static balancing of main rotor blades of the aircraft.

For a typical rotor blade of a rotary-wing aircraft, the blade must meet requirements for balance so that excessive vibration and stress levels of the blade do not result when it is used in the aircraft. The blade balancing also ensures that all main or tail rotor blades used on the aircraft have identical responses. In-process static-balance characteristics of the blade have a direct influence upon dynamic (i.e., spanwise and pitch-moment) balance of the blade and whether such dynamic balance falls inside or outside allowable limits.

More specifically, the blade is formed from several components, including a spar with counterweights, a trailing-edge pocket assembly having at least one skin (such as upper and lower skins with a core therebetween), and a leading-edge assembly having a leading-edge sheath and other structures. These components are typically secured to each other by a structural film-adhesive bond and/or other fastener.

Manufacture and assembly of the components introduce some variation in weight (i.e., mass), weight distribution (i.e., center of gravity), stiffness, and shape into the blade. The weight and spanwise moments of the blade are measured via a static mass-balance procedure during manufacture of the blade to compensate for the variation in the weight and weigh distribution of the components. The procedure often includes a whirl stand in which the blade is rotated with a master rotor blade having a selected weight and weight distribution. The response of the blade is observed and compared to that of the master blade, and any variation between the response/motions is indicative of variation in the weight or weight distribution of the blade compared to the weight or weight distribution of the master blade. Such variation is corrected in the blade by removing material or molded counterweights from the blade up to certain acceptable or feasible limits. The limits constrain how severe an out-of-balance condition of the blade can be corrected, resulting in potential scrapping of the costly blade.

BRIEF DESCRIPTION

In a non-limiting exemplary embodiment, a method of assembling an aircraft rotor blade includes determining first spanwise and chordwise moments of a first component of the blade and comparing the first spanwise and chordwise moments to respective target first spanwise and chordwise moments. The first spanwise and/or chordwise moment(s) of the first component is/are adjusted based upon corresponding results of the comparison to provide balancing of the first component. Second spanwise and chordwise moments of a second component of the blade are determined and compared to respective target second spanwise and chordwise moments. The second spanwise and/or chordwise moment(s) of the second component is/are adjusted based upon corresponding results of the comparison to provide balancing of the second component. The balanced first and second components are assembled to each other so that target spanwise and chordwise moments of the blade are met.

In addition to one or more of the features described above or below, or as an alternative, further embodiments could include where the adjusting of the first spanwise and/or chordwise moment(s) and/or second spanwise and/or chordwise moment(s) includes affixing at least one structural adhesive strip chordwise to and along a substantial entirety of the first and/or second component.

In addition to one or more of the features described above or below, or as an alternative, further embodiments could include where a size of the structural adhesive strip(s) is determined by the corresponding results of the comparison of the first and second spanwise and chordwise moments to the respective target first and second spanwise and chordwise moments.

In addition to one or more of the features described above or below, or as an alternative, further embodiments could include where each adhesive strip is long in a spanwise direction and thin in a chordwise direction of the blade.

In addition to one or more of the features described above or below, or as an alternative, further embodiments could include where a length of each adhesive strip in a spanwise direction of the blade is constant and a width of the adhesive strip in a chordwise direction is variable.

In addition to one or more of the features described above or below, or as an alternative, further embodiments could include where a weight of each adhesive strip is about 0.5 pound.

In addition to one or more of the features described above or below, or as an alternative, further embodiments could include where each adhesive strip is affixed to the first and/or second component(s) at a distance from the leading edge and/or trailing edge of the respective component.

In addition to one or more of the features described above or below, or as an alternative, further embodiments could include where each adhesive strip is affixed to the first and/or second component(s) in a range of about three-and-a-half inches from a leading edge of the respective component to about eight inches from the leading edge of the respective component.

In addition to one or more of the features described above or below, or as an alternative, further embodiments could include where the adjusting of the first spanwise and/or chordwise moment(s) and/or second spanwise and/or chordwise moments includes removing material from the first and/or second component(s).

In addition to one or more of the features described above or below, or as an alternative, further embodiments could include where the material is at least one counterweight.

In addition to one or more of the features described above or below, or as an alternative, further embodiments could include where a weight of the counterweight is about 0.5 pound.

In addition to one or more of the features described above or below, or as an alternative, further embodiments could include where the first spanwise and/or chordwise moment(s) is/are determined by placing the first component on a balance fixture defining at least two load cells (i.e., the minimum number of load cells for a balance fixture) and reading a corresponding load at the load cells.

In addition to one or more of the features described above or below, or as an alternative, further embodiments could include where the first component includes a spar assembly and the second component includes a trailing-edge pocket assembly.

In another non-limiting exemplary embodiment, a method of assembling an aircraft rotor blade includes determining spanwise and chordwise moments of a trailing-edge pocket assembly of the blade and comparing the spanwise and chordwise moments to respective spanwise and chordwise moments of a target trailing-edge pocket assembly. The spanwise and/or chordwise moment(s) of the trailing-edge pocket assembly is/are adjusted based upon corresponding results of the comparison. Spanwise and chordwise moments of a spar assembly of the blade are determined and compared to respective spanwise and chordwise moments of a target spar assembly. The spanwise and/or chordwise moment(s) of the spar assembly is/are adjusted based upon corresponding results of the comparison. The trailing-edge pocket assembly and spar assembly are assembled to each other so that target spanwise and chordwise moments of the blade are met.

In addition to one or more of the features described above or below, or as an alternative, further embodiments could include where the third component includes a leading-edge assembly.

The method achieves the target spanwise moment through the uniform mass distribution and allows for chordwise adjustments (thus saving on tip shim weights and replacing balance paint). Also, the method accounts for the balance of both the spanwise and chordwise moments, which provides flexibility to dynamically balance the blade. Furthermore, the method distributes balance mass in a more uniform matter, such distribution more closely representing variations in distribution of mass of components of the blade. In addition, the method can be implemented with an existing in-process balancing procedure with few modifications thereto.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION

Figure 1:
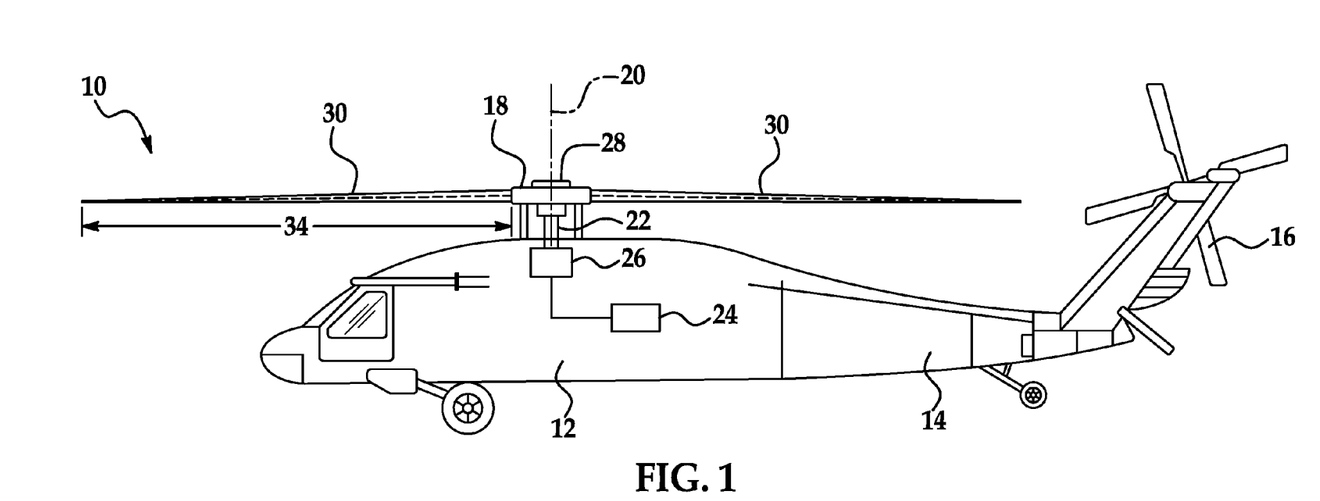
FIG. 1 is a schematic view of a non-limiting exemplary embodiment of a rotary-wing aircraft.

Shown in FIG. 1 is a schematic view of a non-limiting exemplary embodiment of a rotary-wing aircraft—more specifically, a helicopter 10. It is to be appreciated, however, that the disclosure herein may be applied to other types of rotary-wing aircraft, such as dual-coaxial-rotor rotorcraft. It is to be appreciated also that the disclosure may be applied to any rotating blade, such as gas or wind turbines, propellers used in ships, industrial fans, or other like machinery.

The helicopter 10 includes an airframe 12 with an extending tail 14 and a tail rotor 16 located at the extending tail 14. A main rotor assembly 18 is located at the airframe 12 and rotates about a main rotor axis 20. The main rotor assembly 18 is also driven by a drive shaft 22 connected to a power source 24—for example, an engine 24—by a gearbox 26. The main rotor assembly 18 also includes a rotor hub 28 located at the main rotor axis 20 and operably connected to the drive shaft 22. A plurality of rotor blades 30 are connected to the rotor hub 28.

Figure 2:
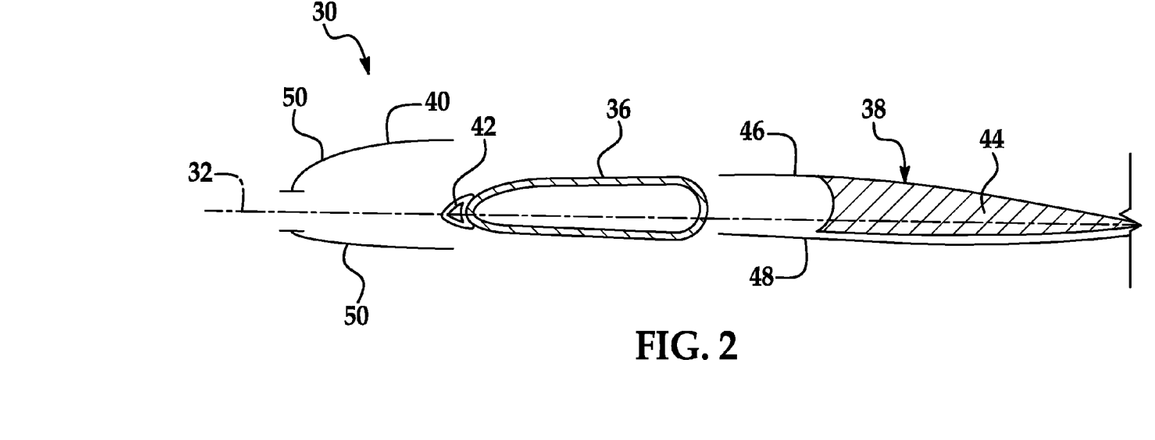
FIG. 2 is a cross-sectional view of a non-limiting exemplary embodiment of a rotor blade of the aircraft illustrated in FIG. 1.

Referring now to FIG. 2, a non-limiting exemplary embodiment of the blade 30 includes assemblies arranged along a chord 32 of the blade 30 extending along a length 34 of the blade 30 (shown in FIG. 1). The assemblies include a spar assembly 36 (i.e., a center assembly 36), a trailing-edge pocket assembly 38, and a leading-edge assembly 40. The spar assembly 36 includes a plurality of molded counterweights 42. The pocket assembly 38 includes a lower core 44 disposed adjacent a high-density core, an upper skin 46 and a lower skin 48. The leading-edge assembly 40 includes a leading-edge sheath 50. While shown as three distinct assemblies 36, 38, 40, the number of assemblies of the blade 30 and construction of the assemblies is not specifically limited.

To ensure the blade 30 is balanced within selected requirements of mass and moments of the blade 30 as a finished assembly, a method is described herein to assemble the blade 30 to achieve a condition of balance of each assembly 36, 38, 40 such that, when the assemblies 36, 38, 40 are finally assembled into the blade 30, no further "balance" procedure (such as a typically used "whirl balance" procedure) is necessary.

Figure 3:
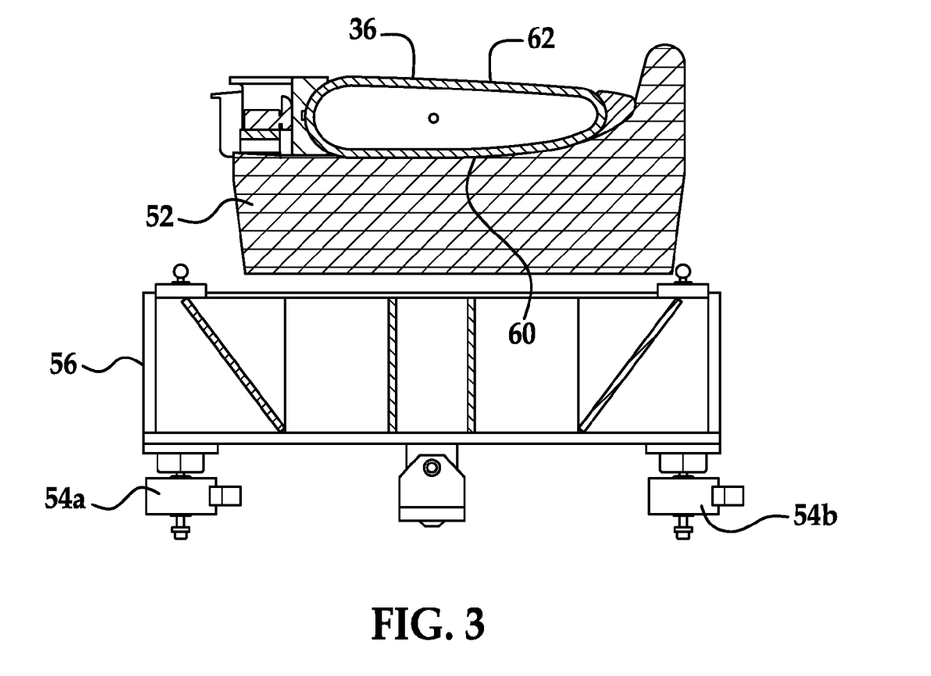
FIG. 3 is a cross-sectional view of a non-limiting exemplary embodiment of a spar assembly for the blade illustrated in FIG. 2 loaded on a balance fixture.
Figure 4:
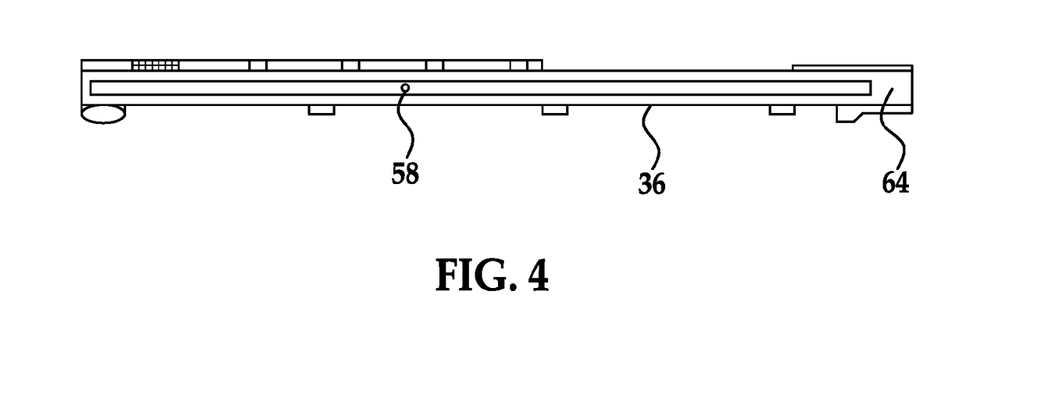
FIG. 4 is a top view of the spar assembly illustrated in FIG. 3 showing an adhesive strip strategically affixed thereto.

First, referring to FIGS. 3 and 4, the spar assembly 36 is balanced. The spar assembly 36 is shown loaded onto a spar-assembly balance fixture 52 or other device, which is in contact with a plurality of load cells 54. As shown, the load cells 54 are secured to a spar-assembly balance table 56 to which the balance fixture 52 is installed. Three load cells 54 are used (only two shown), but it should be readily appreciated that any suitable number of load cells 54 may be used to obtain the desired information. The load cells 54 are arranged such that first and second load cells 54a, 54b are radially outboard from another (third) load cell 54 (not shown). The first and second load cells 54a, 54b are positioned at the same radial location and spaced in a chordwise direction. Moments of the spar assembly 36 are calculated from readings of the respective load cells 54. While not required, a read-out of the load cells 54 can be done by a computer connected to the load cells 54 through wired and/or wireless protocols or read and manually entered into the computer.

Spanwise (root to tip) and chordwise (leading edge to trailing edge) moments of the spar assembly 36 are calculated on the computer or manually in a known manner. The spanwise moment is measured relative to leading and trailing edges of the spar assembly 36, and the chordwise moment is measured relative to a root (or "inboard") and tip (or "outboard") of the spar assembly 36. The spanwise moment of the spar assembly 36 is defined generally as a perpendicular distance of a line of action of a force from an axis of rotation multiplied by a force applied by the spar assembly 36 to the line of action. For example, the spanwise moment can be calculated as the sum of the radial distance of the first load cell 54a to the main rotor axis 20 multiplied by the force applied by the spar assembly 36 to the first load cell 54a and the radial distance of the second load cell 54b and third load cell 54c to the main rotor axis 20 multiplied by the quantity of the forces applied by the spar assembly 36 to the second load cell 54b and third load cell 54c, respectively.

The first and second load cells 54a, 54b are located at the same radial distance from the main rotor axis 20 whereas the third load cell 54c is located at a different radial distance from the main rotor axis 20. However, it should be readily appreciated that the load cells 54 can be located at three different respective radial distances (it not being possible to locate all load cells at a same location.)

The calculated moments are compared to respective target values. Depending upon results of the comparison, at least one action is taken to add or remove mass of any portions of the spar assembly 36 to counteract the spar-assembly moments. Referring to FIG. 4, the added mass is in the form of at least one structural adhesive strip 58 affixed strategically chordwise to and along a substantial entirety of the spar assembly 36 (e.g., over the chord 32 of the blade 30). The adhesive strip 58 is then cured into the blade 30. The removed mass can be in the form of removal of material (e.g., at least one counterweight 42) from the spar assembly 36.

A number and/or size of the adhesive strip 58 is determined by the corresponding results of the comparison of the calculated moments to the respective target values. In an aspect, the adhesive strip 58 is long and constant in a spanwise direction and thin and variable in a chordwise direction of the blade 30. For example, the adhesive strip can be at least two-hundred inches long in the spanwise direction. Also, a thickness of the adhesive strip 58 can be, for instance, about 0.006 inch, and a weight of the adhesive strip 58 can be, for instance, about 0.5 pound. Furthermore, the adhesive strip 58 can be affixed to the spar assembly 36 in a range of about three-and-a-half inches from a leading edge of the spar assembly 36 to about eight inches from the leading edge. It is to be readily appreciated that the adhesive strip can be any suitable length, width, thickness, and weight.

More specifically, spar-assembly-moment differences are defined as the calculated moments subtracted from the respective target values. If, for example, the difference of the spanwise moment of the spar assembly 36 is in a first range (say, greater than or equal to zero but less than forty inch-pounds), the spar assembly 36 is sufficiently span-wise balanced, and no spanwise modification is required. If such difference is within a second range (say, greater than or equal to forty inch-pounds but less than or equal to 234 inch-pounds), spanwise modification is required by way of affixation of a prescribed adhesive strip 58 to a lower face 60 of the spar assembly 36. If such difference is within a third range (say, greater than 234 inch-pounds but less than or equal to 468 inch-pounds), spanwise modification is required by way of affixation of a prescribed pair of adhesive strips 58 to the lower face 60 and an upper face 62, respectively, of the spar assembly 36. Finally, if such difference is in a fourth range (say, greater than 468 inch-pounds but less than or equal to 937 inch-pounds), spanwise modification is required by way of affixation of a prescribed pair of composite adhesive strips 58 to each of the lower and upper faces 60, 62. This procedure applies in a similar manner with respect to the difference of the chordwise moment of the spar assembly 36.

The adjusting of the spanwise and/or chordwise moment (s) of the spar assembly 36 can also be achieved through removal of material from the spar assembly 36. For instance, depending upon the respective values of the spar-assembly-moment differences, at least one counterweight 42 (typically, a plurality of counterweights 42) can be removed from the spar assembly 36 to balance the spar assembly 36. A weight of each counterweight 42 can be about 0.5 pound.

The spanwise length and chordwise width of each adhesive strip 58 are calculated on the computer or manually in a known manner. The spanwise length and chordwise width are proportional to the respective differences. The prescribed adhesive strip(s) 58 is/are centered about a radial location of spanwise/chordwise centers of gravity of the blade 30. It should be readily appreciated that the mass can include at least one weight cup in addition to or instead of the layer(s) 58.

Figure 5:
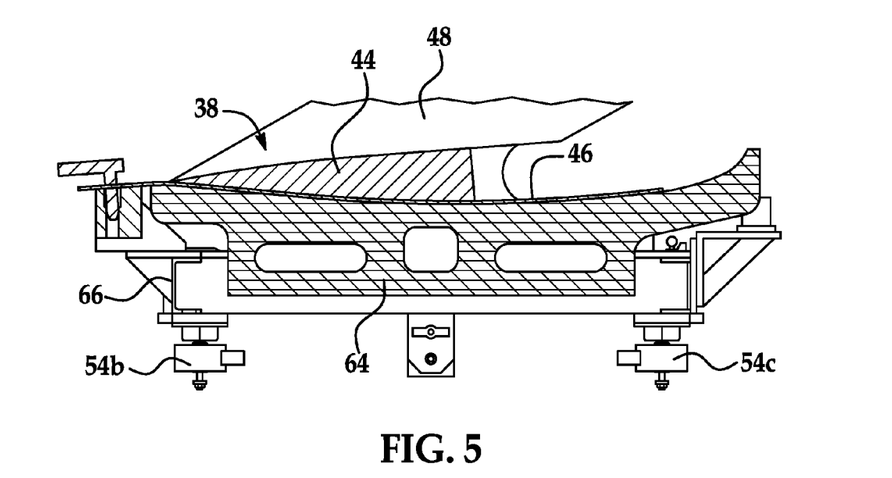
FIG. 5 is a cross-sectional view of a non-limiting exemplary embodiment of a trailing-edge pocket assembly for the blade illustrated in FIG. 2 loaded on a balance fixture.

Similarly, referring to FIG. 5, the pocket assembly 38 is balanced. The pocket assembly 38 is shown loaded onto a pocket-assembly balance fixture 64, which is in contact with a plurality of the load cells 54. As shown, the loads cells 54 are secured to a pocket-assembly balance table 66 to which the balance fixture 64 is installed.

Balancing of the pocket assembly 38 is provided in a manner similar to that in which the balancing of the spar assembly 36 is provided. More specifically, pocket-assembly-moment differences are defined as calculated spanwise and chordwise moments of the pocket assembly 38 subtracted from respective target spanwise and chordwise values of the pocket assembly 38 (which are calculated on the computer or manually in a known manner). If, for example, the difference of the spanwise moment of the pocket assembly 38 is in a first range (say, greater than or equal to zero but less than thirty-five inch-pounds), the pocket assembly 38 is sufficiently span-wise balanced, and no spanwise modification is required. If such difference is within a second range (say, greater than or equal to thirty-five inch-pounds but less than or equal to 288 inch-pounds), spanwise modification is required by way of affixation of a prescribed adhesive strip 58 to the lower core 44 of the pocket assembly 38. In an aspect, the adhesive strip is located spaced from the leading and trailing edges and a root and tip of the blade 30 such that a tip end of the adhesive strip 58 substantially coincides with a transition between the lower core 44 and high-density core of the pocket assembly 38. Finally, if such difference is within a third range (say, greater than 288 inch-pounds but less than or equal to 576 inch-pounds), spanwise modification is required by way of affixation of a prescribed pair of adhesive strips 58 to the lower core 44. This procedure applies in a similar manner with respect to the difference of the chordwise moment of the pocket assembly 38. The adjusting of the spanwise and/or chordwise moment(s) of the pocket assembly 38 can also be achieved through removal of material from the pocket assembly 38.

Figure 6:
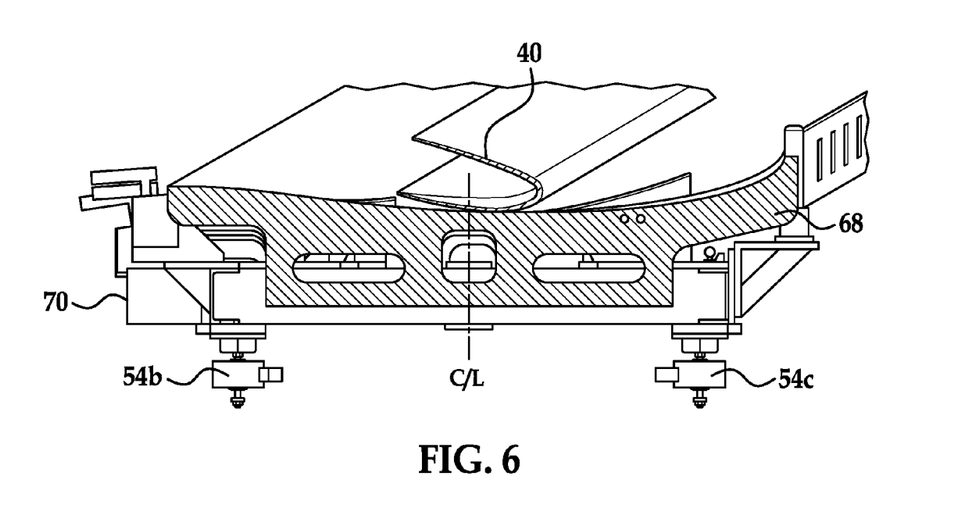
FIG. 6 is a cross-sectional view of a non-limiting exemplary embodiment of a leading-edge assembly for the blade illustrated in FIG. 2 loaded on a balance fixture.

Similarly, referring to FIG. 6, the leading-edge assembly 40, including the leading-edge sheath 50, is balanced. The sheath 50 is shown loaded onto a sheath balance fixture 68, which is in contact with the plurality of load cells 54. As shown, the loads cells 54 are secured to a sheath balance table 70 to which the balance fixture 68 is installed.

Balancing of the leading-edge assembly 40 is provided in a manner similar to that in which the balancing of each of the spar and pocket assemblies 36, 38 is provided. More specifically, leading-edge-assembly-moment differences are defined as calculated spanwise and chordwise moments of the leading-edge assembly 40 subtracted from respective target spanwise and chordwise values of the leading-edge assembly 40 (which are calculated on the computer or manually in a known manner). If, for example, the difference of the spanwise moment of the leading-edge assembly 40 is in a first range, the leading-edge assembly 40 is sufficiently span-wise balanced, and no spanwise modification is required. If such difference is within a second range, spanwise modification is required by way of affixation of a prescribed adhesive strip 58 to the leading-edge assembly 40. Finally, if such difference is within a third range, spanwise modification is required by way of affixation of a prescribed pair of adhesive strips 58 to the leading-edge assembly 40. This procedure applies in a similar manner with respect to the difference of the chordwise moment of the leading-edge assembly 40.

Each of the spar, pocket, and leading-edge assemblies, 36, 38, 40 is balanced as an individual component of the blade 30. Then, the spar, pocket, and leading-edge assemblies, 36, 38, 40 are assembled to form the blade 30. Since the spar, pocket, and leading-edge assemblies, 36, 38, 40 are pre-balanced at a "component" stage, the blade 30 meets target spanwise and chordwise moments for the blade 30, and no further balancing of the blade 30 is required.

In an aspect, all data (e.g., readings and determinations of weight, weight differences, and centers of gravity) are collected and recorded prior to any mixing and matching and in-process balances being calculated. In a version of this aspect, a computer program performs the collecting and automatically records the data in a database. The computer program can perform also the calculating and comparing and, based upon results thereof, determine resultant centers of gravity, the number and size of adhesive strips to affix, and chordwise placement thereof.

Figure 7:
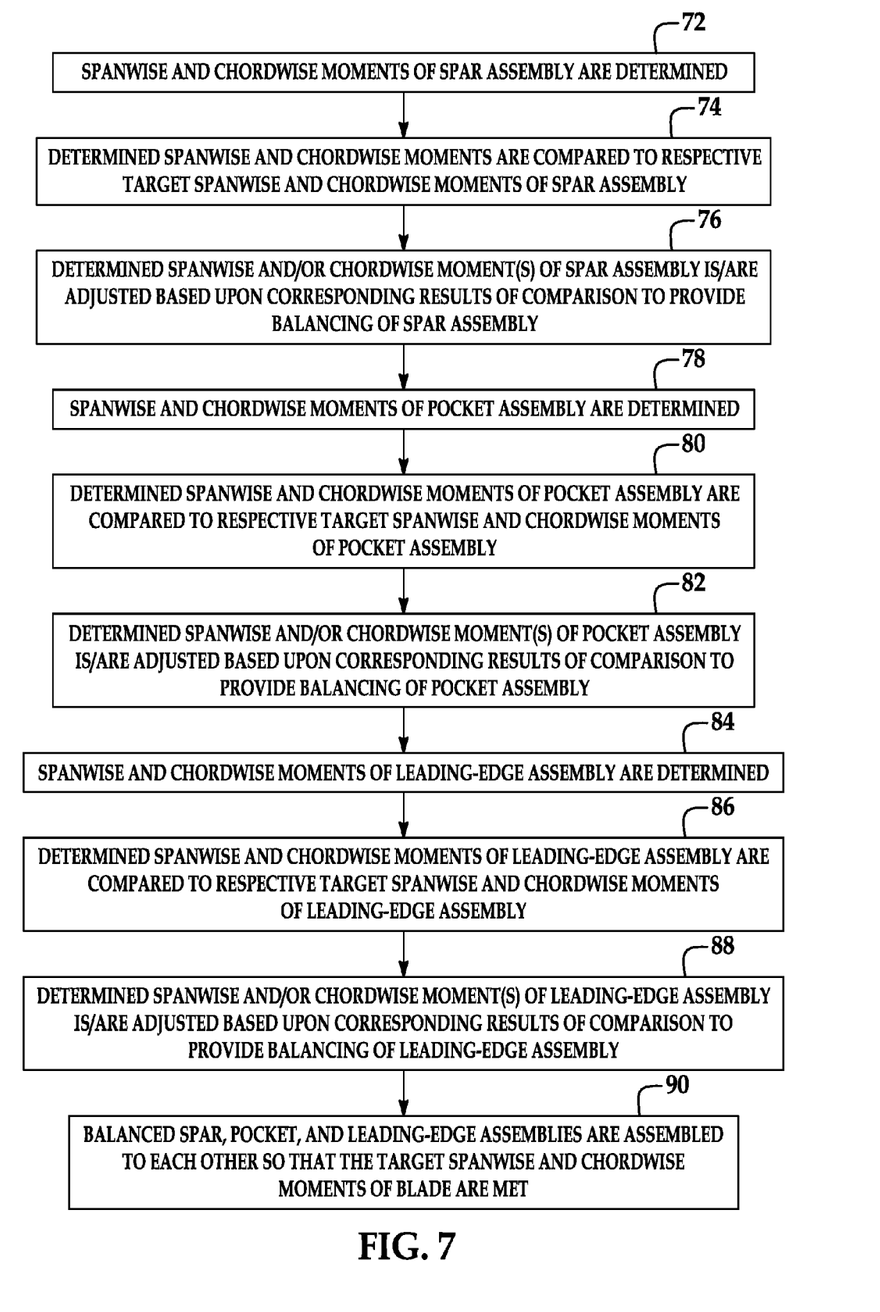
FIG. 7 is a flow diagram of a non-limiting exemplary embodiment of a method of assembling the blade illustrated in FIG. 2 according to the invention.

Referring to FIG. 7, a flow diagram shows a non-limiting exemplary embodiment of a method of assembling the blade 30 according to the invention. At 72, spanwise and chordwise moments of the spar assembly 36 are determined. At 74, the spanwise and chordwise moments of the spar assembly 36 are compared to respective target spanwise and chordwise moments. At 76, the spanwise and/or chordwise moment(s) of the spar assembly 36 is/are adjusted based upon corresponding results of the comparison to provide balancing of the spar assembly 36. At 78, spanwise and chordwise moments of the pocket assembly 38 are determined. At 80, the spanwise and chordwise moments of the pocket assembly 38 are compared to respective target spanwise and chordwise moments. At 82, the spanwise and/or chordwise moment(s) of the pocket assembly 38 is/are adjusted based upon corresponding results of the comparison to provide balancing of the pocket assembly 38. At 84, spanwise and chordwise moments of the leading-edge assembly 40 are determined. At 86, the spanwise and chordwise moments of the leading-edge assembly 40 are compared to respective target spanwise and chordwise moments. At 88, the spanwise and/or chordwise moment(s) of the leading-edge assembly 40 is/are adjusted based upon corresponding results of the comparison to provide balancing of the leading-edge assembly 40. At 90, the balanced spar, pocket, and leading-edge assemblies 36, 38, 40 are assembled to each other so that target spanwise and chordwise moments of the blade 30 are met.

As should be readily appreciated, the invention may be embodied as a system, method, or computer program (embodied in at least one computer-readable medium having computer-readable program code embodied thereon). Accordingly, the invention may take an entirely hardware or software form (including firmware, resident software, micro-code, etc.) or a combination thereof and may generally be referred to herein as a "circuit," "module," or "system."

With the method, the mass of each adhesive strip 58 is distributed uniformly over the blade 30, and the adhesive strip 58 is positioned along the chordwise direction. Also, the target spanwise moment of the blade 30 is met through the mass distribution along the substantial entirety of the blade 30.

The method achieves the target spanwise moment through the uniform mass distribution and allows for chordwise adjustments (thus saving on tip shim weights and replacing balance paint). Also, the method accounts for the balance of both the spanwise and chordwise moments, which provides flexibility to dynamically balance the blade 30. Furthermore, the method distributes balance mass in a more uniform matter, such distribution more closely representing variations in distribution of mass of components of the blade 30. In addition, the method can be implemented with an existing in-process balancing procedure with few modifications thereto. Moreover, it is to be appreciated that the disclosure herein may be applied to other types of procedures for balancing the blade 30 with an existing one of which the method can be implemented with few modifications to the existing procedure.

While the invention has been described in detail in connection with only a limited number of embodiments, it should be readily appreciated that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be readily appreciated that aspects of the invention may include only some of the described embodiments. Accordingly, the invention is not to be seen as limited by the foregoing description, but is only limited by the scope of the appended claims.

What is claimed:

1. A method of assembling a rotor blade comprising:
   determining first spanwise and chordwise moments of a first component of the blade;
   comparing the first spanwise and chordwise moments to respective target first spanwise and chordwise moments;
   adjusting at least one of the first spanwise and chordwise moment of the first component based upon corresponding results of the comparison to provide balancing of the first component;
   determining second spanwise and chordwise moments of a second component of the blade;
   comparing the second spanwise and chordwise moments to respective target second spanwise and chordwise moments;
   adjusting at least one of the second spanwise and chordwise moment of the second component based upon corresponding results of the comparison to provide balancing of the second component; and assembling the balanced first and second components to each other so that target spanwise and chordwise moments of the blade are met;

wherein the adjusting at least one of the first spanwise and chordwise moment of the first component and the adjusting at least one of the second spanwise and chordwise moment of the second component includes adjusting at least one of the first and second chordwise moment by affixing at least one structural adhesive strip to the first and/or second component, and a mass of the at least one structural adhesive strip is distributed uniformly over the blade in a spanwise direction, and wherein a length of the at least one structural adhesive strip in the spanwise direction of the blade is constant and not dependent on the corresponding results of the comparisons, to uniformly distribute the mass of the at least one structural adhesive strip over the blade, and a width of the at least one structural adhesive strip in a chordwise direction is dependent upon the corresponding results of the comparisons.

2. The method of claim 1, wherein the adjusting of at least one of the first spanwise and chordwise moment and at least one of the second spanwise and chordwise moment further includes removing material from the at least one of the first and second component.

3. The method of claim 2, wherein the material removed from the first component is at least one counterweight.

4. The method of claim 3, wherein a weight of the counterweight is about 0.5 pound.

5. The method of claim 1, wherein the adjusting at least one of the first spanwise and chordwise moment and at least one of the second spanwise and chordwise moment includes affixing the at least one structural adhesive strip chordwise to and along a substantial entirety of at least one of the first and second component.

6. The method of claim 1, wherein the width of the at least one structural adhesive strip in the chordwise direction is determined by the corresponding results of the comparison of the first and second spanwise and chordwise moments to the respective target first and second spanwise and chordwise moments.

7. The method of claim 1, wherein the at least one structural adhesive strip is long in a spanwise direction and thin in a chordwise direction of the blade.

8. The method of claim 1, wherein a weight of the at least one structural adhesive strip is about 0.5 pound.

9. The method of claim 1, wherein the at least one structural adhesive strip is affixed to at least one of the first and second component at a distance from at least one of a leading edge and trailing edge of the respective component.

10. The method of claim 1, wherein the at least one structural adhesive strip is affixed to at least one of the first and second component in a range of about three-and-a-half inches from a leading edge of the respective component to about eight inches from the leading edge of the respective component.

11. The method of claim 1, wherein the at least one of the first spanwise and chordwise moment is determined by placing the first component on a balance fixture defining at least two load cells and reading a corresponding load at the load cells.

12. The method of claim 1, wherein the first component includes a spar assembly and the second component includes a trailing-edge pocket assembly.

13. The method of claim 1, wherein the method further comprises:
determining third spanwise and chordwise moments of a third component of the blade;
comparing the third spanwise and chordwise moments to respective target third spanwise and chordwise moments;
adjusting at least one of the third spanwise and chordwise moment of the third component based upon corresponding results of the comparison to provide a balanced third component; and
assembling the balanced third component with at least one of the balanced first and second components so that target spanwise and chordwise moments of the blade are met.

14. A method of assembling a rotor blade comprising:
determining first spanwise and chordwise moments of a first component of the blade;
comparing the first spanwise and chordwise moments to respective target first spanwise and chordwise moments;
adjusting at least one of the first spanwise and chordwise moment of the first component based upon corresponding results of the comparison to provide balancing of the first component;
determining second spanwise and chordwise moments of a second component of the blade;
comparing the second spanwise and chordwise moments to respective target second spanwise and chordwise moments;
adjusting at least one of the second spanwise and chordwise moment of the second component based upon corresponding results of the comparison to provide balancing of the second component; and
assembling the balanced first and second components to each other so that target spanwise and chordwise moments of the blade are met;
wherein the adjusting at least one of the first spanwise and chordwise moment of the first component and at least one of the second spanwise and chordwise moment of the second component includes affixing at least one structural adhesive strip chordwise to and along a substantial entirety of at least one of the first and second component; and a length of the at least one structural adhesive strip in a spanwise direction of the blade is constant and not dependent on the corresponding results of the components to uniformly distribute a mass of the at least one structural adhesive strip over the blade, and a width of the at least one structural adhesive strip in a chordwise direction is variable based upon the corresponding results of the comparisons.

15. A method of assembling a rotor blade comprising:
determining first spanwise and chordwise moments of a first component of the blade;
comparing the first spanwise and chordwise moments to respective target first spanwise and chordwise moments;
adjusting at least one of the first spanwise and chordwise moment of the first component based upon corresponding results of the comparison to provide balancing of the first component;
determining second spanwise and chordwise moments of a second component of the blade;
comparing the second spanwise and chordwise moments to respective target second spanwise and chordwise moments;

adjusting at least one of the second spanwise and chordwise moment of the second component based upon corresponding results of the comparison to provide balancing of the second component; and assembling the balanced first and second components to each other so that target spanwise and chordwise moments of the blade are met;

wherein the adjusting at least one of the first spanwise and chordwise moment of the first component and/or the adjusting at least one of the second spanwise and chordwise moment of the second component includes adjusting the first spanwise and chordwise moments of the first component and/or adjusting the second spanwise and chordwise moments of the second component by adding a mass, a size of the mass determined by corresponding results of comparing the first and/or second spanwise and chordwise moments to the respective target first and/or second spanwiseand chordwise moments, and uniformly distributing the mass over substantially an entirety of the blade in a spanwise direction, and wherein a length of the mass in the spanwise direction of the blade is constant and not dependent on the corresponding results of the comparisons, to uniformly distribute the mass over the blade, and a width of the mass in a chordwise direction is dependent upon the corresponding results of the comparisons.

* * * * *